United States Patent
Yerli

(10) Patent No.: US 11,455,777 B2
(45) Date of Patent: Sep. 27, 2022

(54) SYSTEM AND METHOD FOR VIRTUALLY ATTACHING APPLICATIONS TO AND ENABLING INTERACTIONS WITH DYNAMIC OBJECTS

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 5 days.

(21) Appl. No.: 16/903,114

(22) Filed: Jun. 16, 2020

(65) Prior Publication Data
US 2020/0402309 A1    Dec. 24, 2020

Related U.S. Application Data

(60) Provisional application No. 62/863,092, filed on Jun. 18, 2019.

(51) Int. Cl.
*G06T 19/00*    (2011.01)
*G06T 15/00*    (2011.01)

(52) U.S. Cl.
CPC ............ *G06T 19/00* (2013.01); *G06T 15/005* (2013.01)

(58) Field of Classification Search
CPC ....... G06T 15/08; G06T 19/006; G06T 19/00; G06T 15/005; G06T 17/05; G06Q 20/145;

(Continued)

(56) References Cited

U.S. PATENT DOCUMENTS 8,239,132 B2    8/2012  Ma et al.
8,564,621 B2   10/2013  Branson et al.
(Continued)

FOREIGN PATENT DOCUMENTS

WO    2016/077493 A1    5/2016
WO    2018/144315 A1    8/2018
WO    2016/077493 A8    5/2019

OTHER PUBLICATIONS

Hu, S., et al., "A Mobile Location-Based Architecture for Intelligent Selecting Multi-Dimension Position Data Over Internet," Sino-Korea Chongqing GIS Researcher Center, Chongqing, China; Intelligence GIS Research Center, Department of Computer Science and Engineering, Inha University, Korea, 2017, 4 pages.

(Continued)

*Primary Examiner* — Abderrahim Merouan
(74) *Attorney, Agent, or Firm* — Christensen O'Connor Johnson Kindness PLLC

(57) ABSTRACT

A system, method, and chip, which may be used for attaching digital reality applications to and enabling interactions with dynamic objects in a virtual world. The system comprises a server comprising a persistent virtual world system storing virtual replicas of static and dynamic real world objects. A client device connected to the server via a network enables interaction with one or more digital reality applications virtually attached to dynamic objects of the real world. Chips installed on dynamic objects of the real world store dynamic object data comprising at least geo-location data of the host dynamic objects. Combining static object data stored in the server and the dynamic object data generates a persistent virtual world system that can be streamed to the client device for interaction with users while accurately tracking the dynamic objects and client devices.

20 Claims, 11 Drawing Sheets

(58) Field of Classification Search
CPC ........ G06F 16/687; G06F 3/011; G06F 3/013; G06F 30/10; G06N 3/08; G06N 3/04; H04W 4/029
See application file for complete search history.

(56) References Cited

U.S. PATENT DOCUMENTS

| | | | |
|---|---|---|---|
| 8,681,179 B2 | 3/2014 | Rolleston et al. | |
| 9,129,429 B2 | 9/2015 | Hammond | |
| 9,142,038 B2 | 9/2015 | Lotto et al. | |
| 9,165,318 B1 | 10/2015 | Pauley et al. | |
| 9,319,835 B2 | 4/2016 | Smith et al. | |
| 9,338,599 B1 | 5/2016 | Burgmeier et al. | |
| 9,721,386 B1 | 8/2017 | Worley, III et al. | |
| 10,679,428 B1 | 6/2020 | Chen et al. | |
| 2002/0158873 A1 | 10/2002 | Williamson | |
| 2003/0007678 A1* | 1/2003 | Ohta | G06T 17/00 382/154 |
| 2004/0249809 A1* | 12/2004 | Ramani | G06K 9/6892 |
| 2005/0131607 A1 | 6/2005 | Breed | |
| 2007/0115282 A1 | 5/2007 | Turner et al. | |
| 2009/0244059 A1 | 10/2009 | Kulkarni et al. | |
| 2009/0292464 A1 | 11/2009 | Fuchs et al. | |
| 2010/0325154 A1 | 12/2010 | Schloter et al. | |
| 2012/0236158 A1* | 9/2012 | Oleksy | H04N 5/2251 348/207.1 |
| 2012/0249416 A1 | 10/2012 | Maciocci et al. | |
| 2012/0309373 A1 | 12/2012 | Abogendia | |
| 2013/0009994 A1 | 1/2013 | Hill | |
| 2013/0178257 A1 | 7/2013 | Langseth | |
| 2013/0194164 A1 | 8/2013 | Sugden et al. | |
| 2014/0002444 A1 | 1/2014 | Bennett et al. | |
| 2014/0114845 A1* | 4/2014 | Rogers | G06T 19/006 705/39 |
| 2014/0229542 A1 | 8/2014 | Yu et al. | |
| 2014/0282220 A1 | 9/2014 | Wantland et al. | |
| 2014/0313197 A1 | 10/2014 | Peuhkurinen | |
| 2015/0188984 A1 | 7/2015 | Mullins | |
| 2015/0235432 A1 | 8/2015 | Brounder et al. | |
| 2015/0302664 A1* | 10/2015 | Miller | G06F 3/017 345/633 |
| 2016/0026253 A1 | 1/2016 | Bradski et al. | |
| 2016/0104452 A1 | 4/2016 | Guan et al. | |
| 2016/0133230 A1 | 5/2016 | Daniels et al. | |
| 2017/0024093 A1 | 1/2017 | Dziuk | |
| 2017/0208109 A1 | 7/2017 | Akselrod et al. | |
| 2017/0228937 A1 | 8/2017 | Murphy et al. | |
| 2018/0005450 A1 | 1/2018 | Daniels et al. | |
| 2018/0108184 A1* | 4/2018 | Takahashi | G06T 19/20 |
| 2018/0204385 A1 | 7/2018 | Sarangdhar et al. | |
| 2018/0276891 A1 | 9/2018 | Craner | |
| 2018/0288393 A1 | 10/2018 | Yerli | |
| 2019/0102946 A1 | 4/2019 | Spivack et al. | |
| 2019/0172262 A1 | 6/2019 | McHugh et al. | |
| 2019/0361797 A1 | 11/2019 | Yerli | |
| 2019/0371073 A1 | 12/2019 | Harviainen | |

OTHER PUBLICATIONS

Pontikakos, C., et al., "Location-Based Services: Architecture Overview," Informatics Laboratory, Agricultural University of Athens, 2017, 11 pages.

European Search Report dated Nov. 6, 2020 issued in European Application No. EP20180791.4, 11 pages.

European Search Report dated Nov. 19, 2020 issued in European Application No. EP20180898.7, 9 pages.

European Search Report dated Nov. 6, 2020 issued in European Application No. EP20180805.2, 8 pages.

European Search Report dated Oct. 21, 2020, issued in European Application No. EP20180810.2, 8 pages.

European Search Report dated Nov. 19, 2020 issued in European Application No. 20180869.8, 9 pages.

Meenakshi, V., et al., "An Innovative App With for Location Finding With Augmented Reality Using CLOUD," Proceedings of the 2nd International Symposium on Big Data and Cloud Computing (ISBCC'15); Procedia Computer Science 50:585-589, 2015.

Office Action dated Mar. 18, 2021 issued in U.S. Appl. No. 16/902,512, filed Jun. 16, 2020, 28 pages.

Office Action dated Jul. 8, 2021 issued in U.S. Appl. No. 16/904,163, filed Jun. 17, 2020, 14 pages.

Office Action dated Nov. 15, 2021 issued in U.S. Appl. No. 16/901,968, filed Jun. 15, 2020, 21 pages.

Office Action dated Dec. 17, 2021, issued in U.S. Appl. No. 16/902,024, filed Jun. 15, 2020, 43 pages.

* cited by examiner

SYSTEM AND METHOD FOR VIRTUALLY ATTACHING APPLICATIONS TO AND ENABLING INTERACTIONS WITH DYNAMIC OBJECTS

CROSS-REFERENCE TO RELATED APPLICATION

This application claims the benefit of Provisional Application No. 62/863,092, filed Jun. 18, 2019, the entire disclosure of which is hereby incorporated by reference herein for all purposes.

FIELD

The present disclosure generally relates to computer systems, and more specifically to digital reality applications and interactions with dynamic objects in digital realities.

BACKGROUND

Technology developments for providing digital reality application content to users have enabled experiences that were not possible in the past. Particularly, digital realities, such as augmented reality (AR), virtual reality (VR), and mixed reality (MR), change a user's perception on what they are seeing, hearing, and feeling, and how much of the real world comes into these experiences, providing the user with a sensation of a physical presence in places in the real world or an imagined world.

Traditionally, AR content is positioned one of two ways: locally and globally. Locally, AR may be positioned in relation to a trackable feature near the camera, for example a Marker/QR code, or in 3-D space (e.g., with a point cloud). Globally positioned AR, on the other hand, is positioned relative to a global coordinate system (typically the World Geodetic System (WGS) or the like). As such, this positioning is limited by how accurately and precisely the device can locate and orient itself within the same coordinate system.

The actual tracking of dynamic objects is usually implemented by a number of sensors, many times disregarding the terrain and the location of other objects in a real environment. Some markerless AR techniques employ mapping through SLAM or other methods in order to position applications and enable interactions between the applications and real objects in a scene, but these techniques may be time or resource consuming. Experiences are also usually individualized depending on the viewing position and orientation of a user without enabling shared experiences with other users. Furthermore, users may need to download applications that are later run directly on a user's client device, making it time-and-resource-consuming for the client devices. Finally, tracking of the viewing position and orientation of client devices is decisive on how the media streams are transferred to users. However, current tracking techniques may result inaccurate and may lead to media streams being uncoordinated with a user's movements, causing problems such as vertigo, discomfort, and resulting sometimes in low interaction times and demand for such applications.

What is desired is a system and method that enables personal or shared interactions with digital reality applications that take into account the relationship with the real world while providing an accurate tracking of objects and users in the real world.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Drawbacks disclosed in the background are addressed in embodiments of the current disclosure through systems and methods for attaching digital reality applications to and/or enabling interactions with dynamic objects. The systems and methods comprise virtualizing static objects of the real world and virtually attaching one or more chips comprising object or application data to dynamic objects. Data from the chips may be transferred directly to client devices, reducing latency and enhancing the digital reality experience, while the data from the static objects may be available from the server, generating, from the point of view of the user, a smooth virtual world comprising dynamic and static objects. Virtualizing static objects of the real world before attaching applications enables effects such as collisions and occlusion between static objects and dynamic objects or other virtual objects to be presented in a more realistic way. Additionally, the systems and methods may include real-time movement and eye-tracking capabilities that enable media streams to be provided in accordance to the position and orientation of the viewers. Attaching or embedding a chip to or in the dynamic objects may also enable configuring the dynamic objects in augmented, virtual, or merged reality to implement physical or virtual changes upon them. The applications and virtual objects may be interacted with via client devices such as one or more of mobile devices, personal computers, game consoles, media centers, and head-mounted displays.

A system of the current disclosure comprises a server configured to store and process data, the server comprising a persistent virtual world system storing virtual replicas of static and dynamic real world objects; and chips installed on dynamic objects of the real world comprising a memory and processor, the memory including dynamic object data and instructions that, when executed by the processor, trigger the processor to perform one or more physical or virtual actions on the host dynamic object. The dynamic object data comprises at least geo-location data of the host dynamic objects. Combining static object data stored in the server and the dynamic object data generates a persistent virtual world system, and content of the persistent virtual world system can be streamed to client devices for interaction with users. As a user with a client device approaches a host dynamic object associated with (e.g., virtually attached to) a digital reality application, the digital reality application retrieves the physical position and orientation of the client device, triggering the client devices to retrieve and output application data from the server, chip, or combinations thereof. In an embodiment, the client device is connected to the server via a network and enables interaction with one or more digital reality applications virtually attached to dynamic objects. The client device receives a media stream corresponding to the application(s) as viewed within the persistent virtual world system in augmented reality, virtual reality, or mixed reality.

In one embodiment, the chips are configured to retrieve additional data comprising physics data, a 3D data structure, and one or more applications or application data from the one or more servers, wherein the chips are configured to combine the additional data with the geo-location data stored in the chips and stream the combined data to the client device. The client device may simultaneously receive static object data from the server. The client devices may merge the additional data and server data into one persistent virtual world system comprising objects of the world and corresponding applications.

In another embodiment, the dynamic object data comprises physics data, a 3D data structure, one or more applications or application data, and the geo-location data, and the dynamic object data is configured to be retrieved by the client device directly from the chip and combined by the client device with static object data from the one or more servers into the persistent virtual world system.

In another embodiment, additional data comprising physics data, a 3D data structure, and/or one or more applications virtually attached to the dynamic objects are stored in the one or more servers, and wherein the one or more servers are configured to merge the geo-location data from the chip and the additional data into the persistent virtual world system, which may be streamed to the client device.

In another embodiment, additional data comprising physics data, a 3D data structure, and/or one or more applications or application data, and geo-location are stored in the chip and are transferred to the one or more servers, wherein the one or more servers are configured to merge the additional data and static object data into the persistent virtual world system, which may be streamed to the client device.

In any embodiment where such additional data is stored in a server, a chip may store one or more references to one or more locations of the additional data in one or more servers, which may include related data or metadata. In an illustrative scenario, a client device may directly connect to the chip (which may be located, for example, in the client device or in any real world object or computing device, such as an Internet of Things (IoT) device)), and the chip stores a location (or data or metadata pointing to the location) in a server, enabling the chip to access and retrieve the data in the server before transmitting it to the client device. The data or metadata referencing the location of the additional data in the server can be some type of reference ID number, code, or other type of location data pointing or referencing to a database in the server comprising the additional data.

In one embodiment, media experiences from digital reality applications may be shared among two or more users. The server may calculate the pose (position and orientation) of two or more client devices and provide the corresponding media streams for each client device, while retrieving the location and, if necessary, other data of the host dynamic object from the chip.

According to an embodiment, the digital reality applications may utilize one or more of a plurality of techniques to broadcast a signal to the client devices, alerting the client devices that a digital reality application is available in proximity to the location of the client devices. In one embodiment, if the user has previously subscribed to an application in the server, the location of the client device may then be tracked by the server. Therefore, when a user approaches a digital reality application, the digital reality application may already prepare to broadcast the signals to the client device. In one embodiment, as a user with a client device enters a location where the digital reality application is active, the digital reality application may detect a signal from the device via a receiver or two-way transceiver from the chip, indicating that the device can receive a digital reality application media stream prior to broadcasting the signal.

In some embodiments, the media stream comprises augmented reality, virtual reality, or mixed reality content. The media stream can comprise 3D image data, 3D geometries, 3D entities, 3D sensory data, 3D dynamic objects, video data, audio data, textual data, time data, positional data, orientational data, and lighting data, amongst others. Thus, the media streams may include shapes and images that match the dynamic objects to which the digital reality applications are virtually attached, or may be an augmentation of the same comprising changes in one or more features of the shapes corresponding to the specific functions of the digital reality applications.

In one embodiment, a 3D interactive shape of dynamic objects is generated by employing approximation techniques using the location of client devices or chips on the dynamic objects. The 3D interactive shapes allow programmers to virtually attach digital reality applications and enable interactions between users and the dynamic objects and applications. The approximation techniques may include extrapolation or interpolation techniques. More specifically, the 3D interactive shape may be extrapolated from shape data on the chip or from the chip and one or more client devices, or interpolated from shape data from the chip and one or more client devices on the dynamic object. For example, the 3D interactive shape of dynamic objects may be, when in the absence of any other client devices, extrapolated only from one device such as from a head-mounted display in order to calculate a downward approximation of a user. If two devices are present, for example, a head-mounted-display and a shoe chip, the server may interpolate a section between the two devices. In another example, a user may use a head-mounted display, a cell phone, and a chip in one or both shoes, and the interactive volume may be interpolated by using data from the 3 or more devices. Thus, in these embodiments, the 3D interactive shape corresponds to an approximation of the shape of the dynamic object to which the chip is attached, and the accuracy of the interactive shape with respect to the dynamic object shape is proportional to the number and location of devices on the dynamic object.

According to an embodiment, the dynamic object data includes a 3D data structure configured to generate a 3D interactive shape. In an illustrative scenario, the 3D data structure generates a 3D interactive shape that users may view and interact with via the client devices. The 3D data structure refers to a data organization and storage format of 3D objects that enables efficient access and modification, including, for example, octrees, quadtrees, BSP trees, sparse voxel octrees, 3D arrays, and k-d trees. The 3D data structure may be stored, for example, in the server or in the chip attached to or embedded in the dynamic object and connected to the server. When the 3D data structure directly generates the 3D interactive shape, the level of accuracy of the interactive shape with respect to the dynamic object may be higher than an approximation via extrapolation or interpolation, but may require more data as well as processing power to generate the 3D interactive shape. In some embodiments, the 3D data structure may be input via modeling tools such as via readily-available CAD or CAE models of the objects. For example, a car owner may provide an administrator of the persistent virtual world system or may input by themselves the already-existing digital CAD or CAE models of their car. In other embodiments, the modeling tools enable a car or drone-based image-scanning pipeline to be input through a variety of photo, video, depth simultaneous location and mapping (SLAM) scanning in order to model the virtual replicas. In other embodiments, radar-imaging, such as synthetic-aperture radars, real-aperture radars, Light Detection and Ranging (LIDAR), inverse aperture radars, monopulse radars, and other types of imaging techniques may be used to map and model static objects before integrating them into the persistent virtual world system. Utilizing these more technical solutions may be performed especially in cases where the original models of the structures are not available, or in cases where there is missing information or there is a need to add additional information to the virtual world entities which is not provided by the CAD or CAE models.

According to an embodiment, the one or more actions triggered by the chip on the host dynamic object include physical, virtual, or mixed modifications on the host dynamic objects. In one embodiment, an application virtually attached to the host dynamic object including the chip may implement a host dynamic object configurator enabling an end-user to virtually modify the object but also to implement one or more physical changes on the host dynamic object. For example, the configurator may enable a user to view a shoe worn by another user, may augment the shoe to view available sizes, colors, and prices of the shoe as well as one or more stores where the shoe may be available. The application may connect through a network to store servers including the merchandise data. In another example, the configurator may enable a user wearing a shoe including a chip, to implement a physical change in the shoe, such as changing the temperature of the shoe (e.g., cooling down, drying, or heating the shoe). It may be understood by someone skilled in the art that in order for a physical change to be implemented in the shoe, corresponding operational mechanisms and circuitry need to be connected to the chip attached to or embedded in the shoe, such as a power source, and I/O module, a network interface, and one or more heating or cooling elements.

In an embodiment, in order to reduce hardware and network demands, contribute to the reduction of network latency, and improve the general digital reality experience, the system may connect through a network including millimeter-wave (mmW) or combinations of mmW and sub 6 GHz communication systems, such as through $5^{th}$ generation wireless systems communication (5G), or a wireless local area networking (Wi-Fi) providing data at, e.g., 60 GHz. Provided communication systems may allow for low (e.g., about 1 to about 5 millisecond) end-to-end (E2E) latency and high (e.g., 1-10 Gbps) downlink speeds to end points in the field, complying with parameters necessary for executing the typically highly-interactive digital reality applications 110. This results in high-quality, low latency, real-time digital application content streaming. In other embodiments, the system may communicatively connect through 4th generation wireless systems communication (4G), may be supported by 4G communication systems, or may include other wired or wireless communication systems.

According to an embodiment, sensing mechanisms mounted on the dynamic objects and/or on the client devices include a combination of inertial tracking sensing mechanisms and transceivers. The inertial tracking sensing mechanisms can make use of devices such as accelerometers and gyroscopes, which may be integrated in an inertial measuring unit (IMU). Accelerometers measure linear acceleration, which can be integrated to find the velocity and then integrated again to find the position relative to an initial point. Gyroscopes measure angular velocity, which can be integrated as well to determine angular position relatively to the initial point. Additional accelerometers and gyroscopes separate from the IMU may also be incorporated. The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device.

According to an embodiment, a chip of the current disclosure may be used in a system for virtually attaching digital reality applications to and enabling interactions with host dynamic objects. The chip comprises a memory storing dynamic object data and instructions of a host dynamic object in a virtual world system, the dynamic object data comprising at least geo-location data of the host dynamic object, and a processor configured to execute instructions in the memory that, when executed by the processor, trigger the processor to perform one or more actions on the host dynamic object, such as causing the host dynamic object to be virtually or physically manipulated. The chip may include one or more sensors configured to provide at least the geo-location data. The dynamic object data and data stored in a server are combinable to generate content in the persistent virtual world system to be streamed to client devices interacting with applications.

The data stored in the chip may further comprise 3D data structure, physics data, and digital reality applications of the host dynamic objects. In other embodiments, the chip is configured to retrieve the 3D data structure, physics data, and digital reality applications from a server, and only provide the geo-location data to the server. In one embodiment, the 3D data structure in the chip or retrieved from the server generates a 3D interactive shape that users may view and interact with via the client devices. The 3D data structure may generate a 3D interactive shape where the digital reality applications may be attached, or may be generated by approximation techniques such as extrapolation or interpolation. In one embodiment, generation and tracking of the geo-location data is performed through time of arrival (TOA), angle of arrival (AOA), visual imaging, GPS, radar technology, or combinations thereof.

According to an embodiment, a method comprises creating, via a replica editor stored in the server, virtual replicas of static objects from the real world, the virtual replicas including at least location and space settings, physics settings, and a 3D data structure; connecting one or more chips to dynamic objects, the one or more chips comprising a memory and processor, the memory including dynamic object data and instructions that, when executed by the processor, trigger one or more actions by the respective host dynamic object, the dynamic object data comprising at least geo-location data of the host dynamic objects; virtually attaching one or more applications to the dynamic objects; and generating a combination of data from the server and data from the chip in a persistent virtual world system. The method may further include approaching and looking, by a user employing a client device, at one or more of the digital reality applications; retrieving, by the client device, a combination of server and chip data that outputs applications and enables interactions in the persistent virtual world system; and interacting with digital reality application content via the client device.

The dynamic object data may include a 3D data structure configured to generate a 3D interactive shape. According to an embodiment, the method further comprises retrieving from the server by the one or more chips, additional data of the dynamic objects comprising physics data, a 3D data structure, and one or more applications or application data; combining the additional data with the geo-location data from the chip; and streaming the combined data directly to one or more client devices. The method may further include simultaneously receiving, by the client device, static objects data from the server; and merging, by the chip, chip data and server data into one persistent virtual world system.

In another embodiment, the method further comprises retrieving, by the client device, data comprising a 3D data structure, one or more applications or application data, and/or the geo-location data from the chip; receiving (e.g., simultaneously) static object data from the server; and combining the data retrieved from the chip and the received static object data into a persistent virtual world system, content of which may be output by the client device.

In another embodiment, the method further comprises storing in the server additional data comprising physics data, a 3D data structure, and/or one or more applications virtually attached to the dynamic objects; retrieving, by the server, geo-location data from the chip; and merging the geo-location data from the chip and the additional data into a persistent virtual world system, which may be streamed to the client device.

In another embodiment, the method further comprises storing in the chip additional data comprising physics data, a 3D data structure, and/or one or more applications or application data along with geo-location data; transferring the additional data along with the geo-location data to the server; and merging the additional data, the geo-location data, and static object data into a persistent virtual world system, which may be streamed to the client device.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
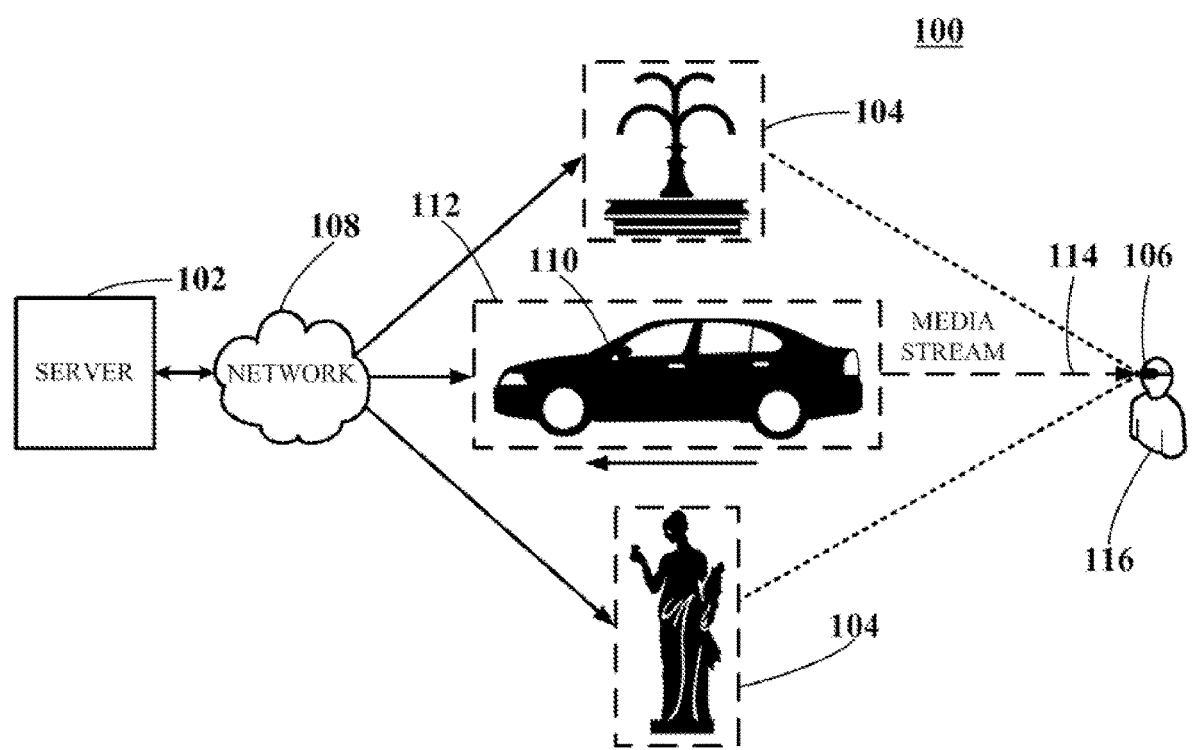
FIG. 1 depicts a system for virtually attaching digital reality applications to and/or enabling interactions with dynamic objects, according to an embodiment.

FIG. 1 depicts a system 100 for virtually attaching digital reality applications to and/or enabling interactions with dynamic objects, according to an embodiment.

System 100 comprises a server 102 configured to store and process data, the server 102 comprising a persistent virtual world system storing virtual replicas of real world static objects 104; a client device 106 connected to the server via a network 108, the client device 106 enabling interaction with one or more digital reality applications; and a chip 110 installed on dynamic objects 112 of the real world comprising a memory and processor, the memory including data and instructions that, when executed by the processor, trigger the processor to perform one or more physical or virtual actions on the host dynamic object 112.

In the current disclosure, the term "virtual replica" refers to accurate and persistent virtual representations of real-world elements. In an embodiment, a virtual replica comprises data and models that provide self-computing capabilities and autonomous behavior. The data and models of the virtual replicas may be input through a plurality of software platforms, software engines, and sensors connected to real-world elements. Data are the attributes of the virtual replicas and the models are the graphical, mathematical and logic representations of any aspect of the corresponding real-world element that may be used to replicate the reality in the persistent virtual world system, such as 3D models, dynamic models, geometric models, and machine learning models.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas, purely virtual objects and digital reality applications cease, and independent of users being connected to the virtual world system. Thus, the virtual world system is saved in a non-volatile storage location, e.g., in the server 102. In this way, virtual replicas, purely virtual objects and digital reality applications may interact and collaborate with each other when being configured for accomplishing specific goals even if users are not connected to the server.

"Self-computing capabilities", also referred to as "self-managing capabilities" refers herein to the ability of a virtual replica of the persistent virtual world system to apply artificial intelligence algorithms in order to autonomously manage computer resources (e.g., distributed computing resources). In an embodiment, virtual replicas with self-computing capabilities are able to autonomously manage computing resources to adapt to changes in the environment of corresponding real-world elements or in the real-world elements themselves. Thus, in an embodiment, each virtual replica may act autonomously depending on the conditions in the real world reflected in the persistent virtual world system, e.g., by allocating required resources, autonomously sending and executing commands and generating events as may be required by each circumstance. Achieving this type of behavior may require training the virtual replicas with artificial intelligence algorithms during the modeling of the virtual replicas. Thus, the role of a virtual replica editor may be limited to defining general policies and rules that guide the self-management process. For example, in the case of a car accident, the virtual replicas of autonomous vehicles close to the accident may decide to lower their speed or come to a stop in order to worsen traffic conditions, and notify the relevant authorities, before the passengers in the vehicle can even know that there was an accident.

The system 100 of the current disclosure may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

In the current disclosure, the term "static" is used to characterize objects that have a fixed position and orientation in the real world, and thus a corresponding fixed position and orientation input in the respective virtual replica in the persistent virtual world system. For example, the term "static" may be used to characterize objects in the real world that under typical conditions stay in the same location, such as the fountain and statue illustrated as static objects 104 in FIG. 1. Only in remote situations may static objects be displaced from their fixed location, such as during remodeling of an area comprising the static objects. In such cases, the position and orientation of the displaced static objects may have to be updated manually or based on sensory data (e.g., optical data from cameras, radar data, and the like). Other examples of static objects may comprise natural formations, such as rocks, valleys, rivers, volcanoes, mountains, lakes, and trees.

In the current disclosure, the term "dynamic" is used to characterize objects that have a variable position and orientation in the real world, and thus a corresponding variable position and orientation in the virtual replica of the persistent virtual world system. For example, the term "dynamic" may be used to characterize objects in the real world that may normally be displaced from one area to another one, such as the car illustrated as a dynamic object 112. Other example dynamic objects may be any type of moving vehicle, such as bicycles, drones, planes, and boats. In other examples, dynamic objects may also comprise living beings, such as humans and animals.

The data of the chip 110 comprises at least geo-location data of the host dynamic objects. Combining the static objects data stored in the server 102 and the chip data on dynamic objects 112 generates a persistent virtual world system. As a user 116 with a client device 106 approaches a digital reality application, the digital reality application retrieves the physical position and orientation of the client device 106, triggering the client devices 106 to retrieve and output application data from the server 102, from the chip 110, or combinations thereof, comprising a media stream 114 corresponding to the applications seen within the environment of the persistent virtual world system in any of augmented, virtual, or mixed reality. In some embodiments, the chip 110 may provide the data directly to the client device 106, reducing latency and enhancing user experience. In other embodiments, the chip may also send part or all of the data to the server, where the dynamic object data and applications may be merged with the static objects data to form a persistent virtual world system that is streamed via the network 108 to the client device 106.

In an embodiment, in order to reduce hardware and network demands, contribute to the reduction of network latency, and improve the general digital reality experience, the system 100 may connect through a network 108 including millimeter-wave (mmW) or combinations of mmW and sub 6 GHz communication systems, such as through $5^{th}$ generation wireless systems communication (5G), or a wireless local area networking (Wi-Fi) providing data, e.g., at 60 GHz. Provided communication systems may allow for low (e.g., about 1 to about 5 millisecond) end-to-end (E2E) latency and high (e.g., 1-10 Gbps) downlink speeds to end points in the field, complying with parameters necessary for executing the typically highly-interactive digital reality applications 110. This results in high-quality, low latency, real-time digital application content streaming. In other embodiments, the system 100 may communicatively connect through 4th generation wireless systems communication (4G), may be supported by 4G communication systems, or may include other wired or wireless communication systems.

In one embodiment, media experiences from digital reality applications may be shared among two or more users 116. The server 102 may calculate the pose (position and orientation) of the two or more client devices 106 and provide the corresponding media streams 114 for each client device 106, while retrieving the location and, if necessary, other data of the host dynamic object 112 from the chip 110.

According to an embodiment, the digital reality applications may utilize one or more of a plurality of techniques to broadcast a signal to the client devices 106, alerting the client devices 106 that a digital reality application is available in proximity to the location of the client devices 106. In one embodiment, if the user 116 has previously subscribed to an application in the server 102, the location of the client device 106 may then tracked and available at the persistent virtual world system stored in the server 102. Therefore, when a user 116 approaches a digital reality application, the digital reality application may already prepare to broadcast the signals to the client device. In one embodiment, as a user 116 with a client device enters a location where the digital reality application is active, the digital reality application may detect a signal from the device via a receiver or two-way transceiver from the chip 110, indicating that the client device 106 can receive a digital reality application media stream 114 prior to broadcasting the signal.

In some embodiments, the media stream 114 comprises augmented reality, virtual reality, or mixed reality content. The media stream 114 can comprise 3D image data, 3D geometries, 3D entities, 3D sensory data, 3D dynamic objects, video data, audio data, textual data, time data, positional data, orientational data, and lighting data, amongst others. Thus, the media streams 114 may include shapes and images that match the dynamic objects where the digital reality applications are attached, or may be an augmentation of the same comprising changes in one or more features of the shapes corresponding to the specific functions of the digital reality applications.

FIGS. 2A-2D depict several embodiments of a system 200 for virtually attaching digital reality applications to and/or enabling interactions with dynamic objects 112. Some elements of FIG. 2A-2D may be similar to elements of FIG. 1, and thus similar or identical reference numerals may be used to identify those elements.

Figure 2A:
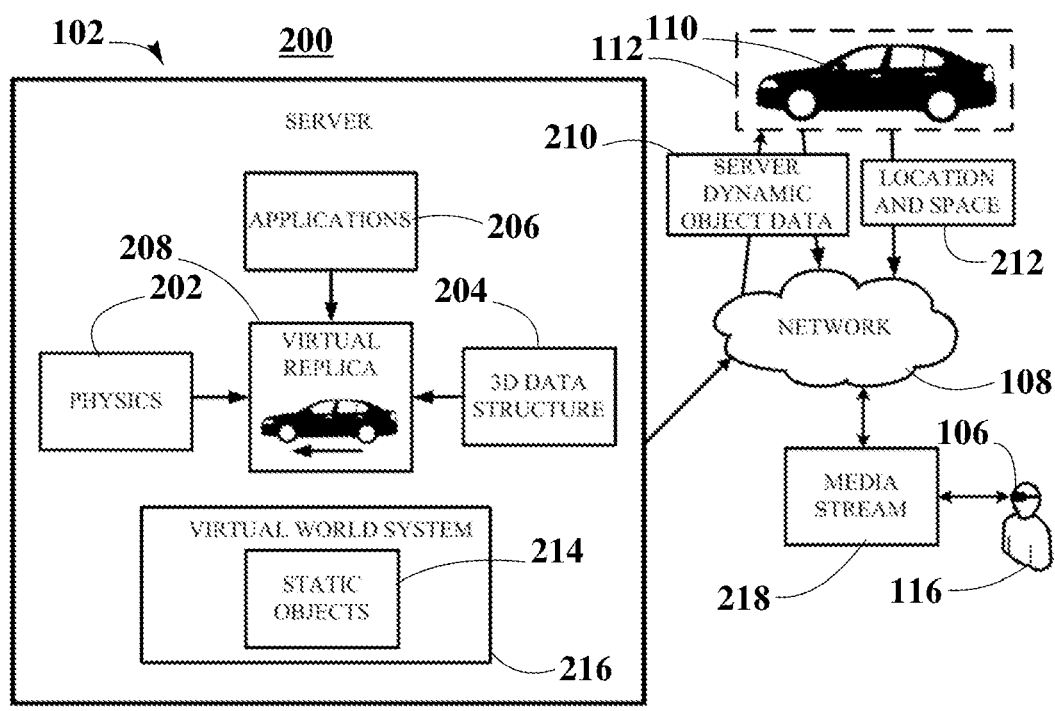
FIGS. 2A-2D depict several embodiments of the system, which may be used for virtually attaching digital reality applications to and/or enabling interactions with dynamic objects.

In the embodiment described with reference to FIG. 2A, data comprising physics data 202, a 3D data structure 204, and one or more applications 206 and/or application data are input into a virtual replica 208 and retrieved by the chip 110 as server dynamic object data 210 from the server 102. The chip 110 combines the data with geo-location data 212 and streams the data directly to the client devices 106 via a network 108. The client devices 106 simultaneously receive the static objects data 214 from the server 102. The client devices 106 then merge the chip data and the server data into one persistent virtual world system 216 which is output to users 116 as a media stream 218 in any of augmented reality, virtual reality, or mixed reality.

Figure 2B:
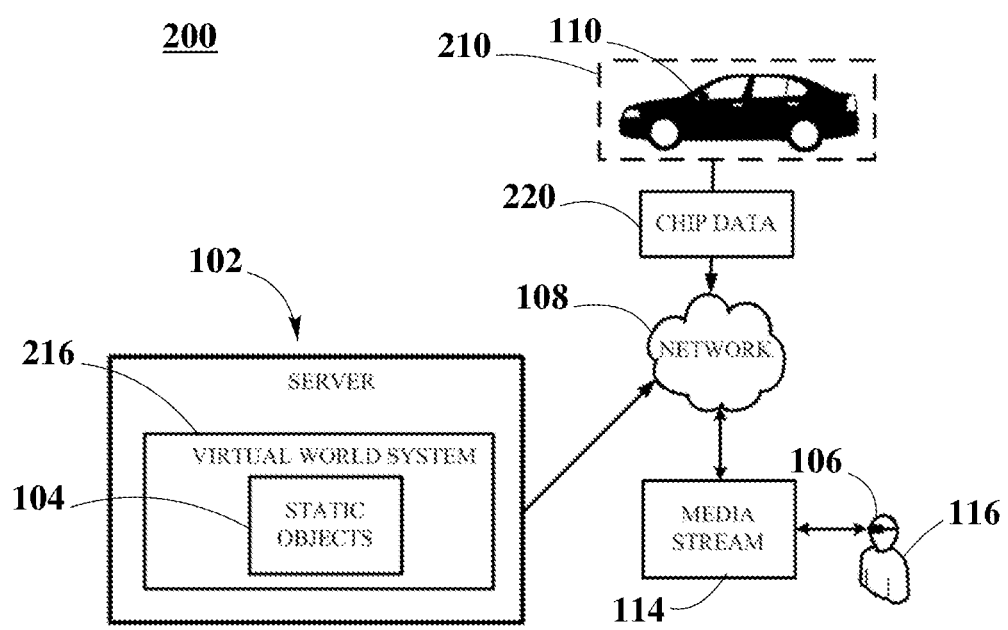

In the embodiment described with reference to FIG. 2B, data comprising physics data 202, a 3D data structure 204, one or more applications 206 and/or application data, and geo-location data 212 are stored in the chip 110 as chip data 220 and are streamed directly to the client devices 106 via a network 108. The client device 106 simultaneously receives the static object data 214 and combines the data in the media stream 114 output to users 116 via client devices 106.

Figure 2C:
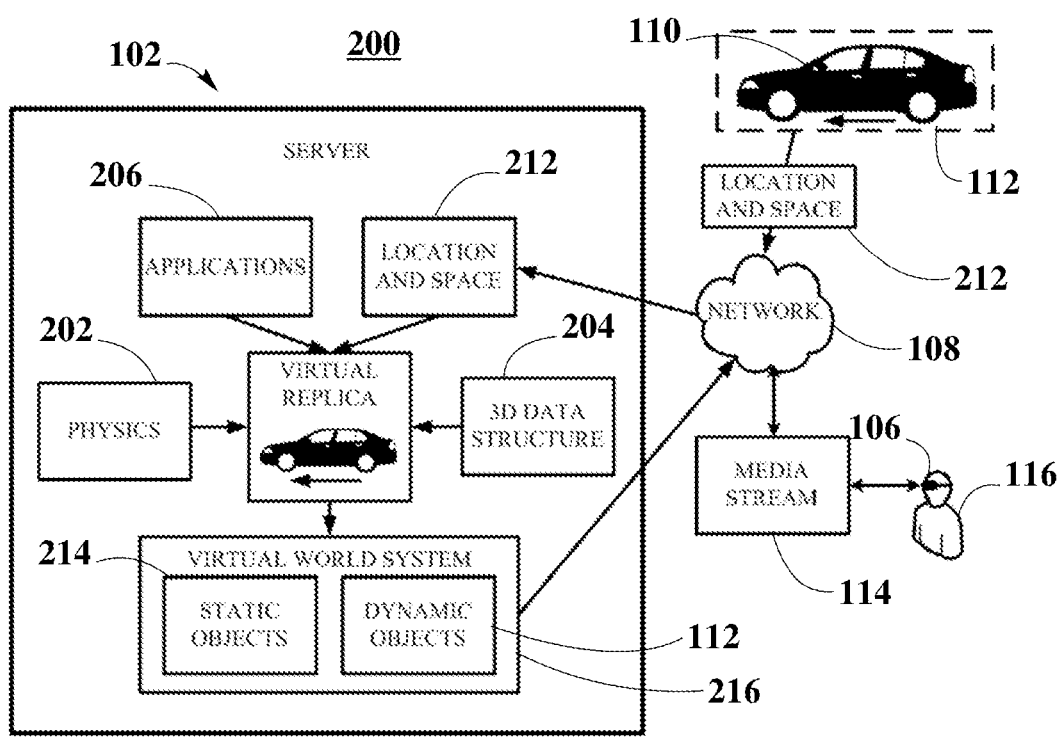

In the embodiment described with reference to FIG. 2C, data comprising physics data 202, a 3D data structure 204, and/or one or more applications 206 virtually attached to dynamic objects 112 are stored in the server 102, but the geo-location data 212 is retrieved from the chip 110. The server 102 then merges the geo-location data 212 from the chip 110 and the server data into a persistent virtual world system 216, which are streamed to the client device 106.

When an application 206 is virtually attached to an element of the real world such as dynamic object 112, the application 206 may, for example, be positioned or repositioned within a space in tandem with the object to which it is virtually attached, or be removed from or reintroduced into a space as the object to which it is attached is removed from or reintroduced into that space. Alternatively, the application 206 may be unattached or detached from an object to which it was virtually attached. If the application 206 is unattached, the application may be positioned in a space independent of the position of any object. If the application 206 is detached from an object to which it was virtually attached, the application may, for example, be removed from a space in which that object is still present, or remain in a fixed location that is independent of the location of that object, or move independently of that object.

Figure 2D:
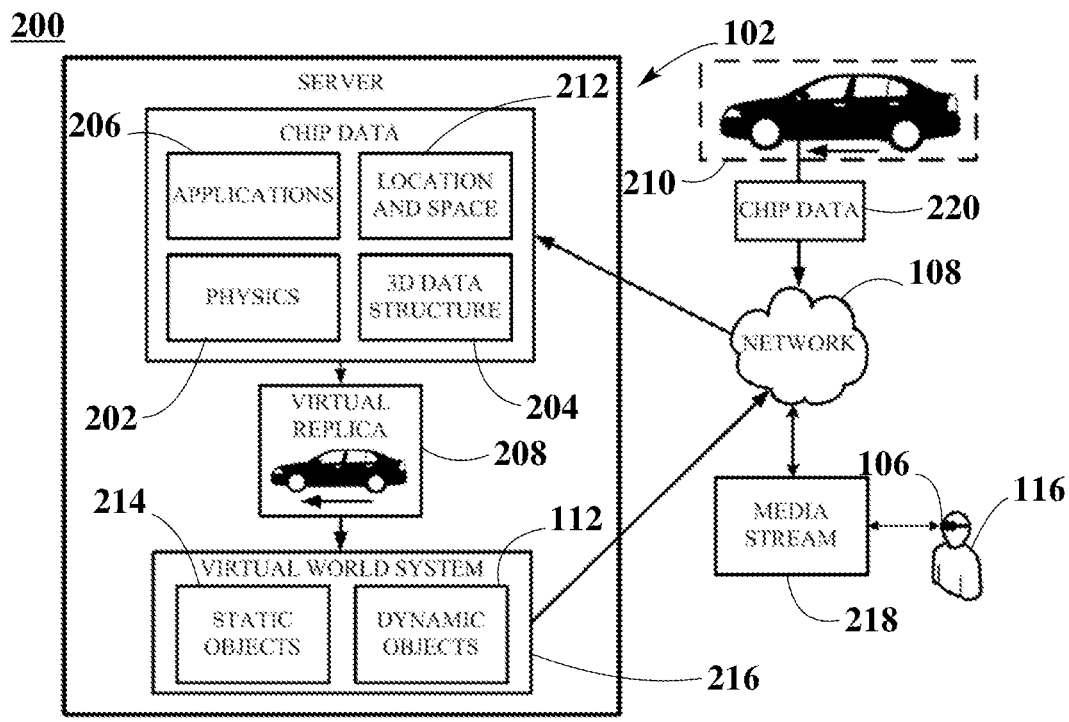

In the embodiment described with reference to FIG. 2D, data comprising physics data 202, a 3D data structure 204, one or more applications 206 and/or application data, and geo-location data 212 are stored in the chip 110 and are transferred to the server 102. The server 102 then merges the chip data and the static objects 214 into a persistent virtual world system 216, which are streamed to the client device 106.

Figure 3A:
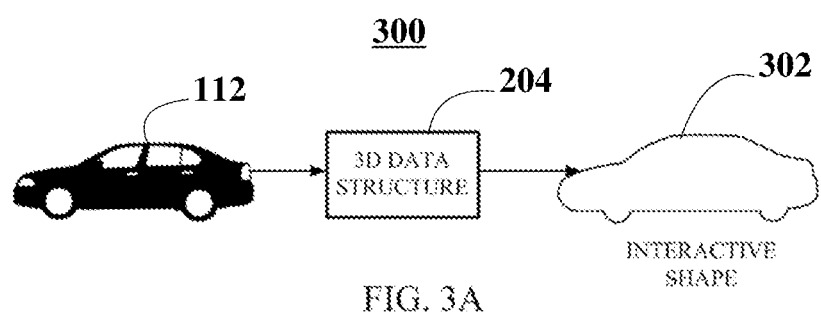
FIGS. 3A-3B depict an interactive volume generated from a 3D data structure, as used in a system for virtually attaching digital reality applications to and/or enabling interactions with dynamic objects, according to an embodiment.
Figure 3B:
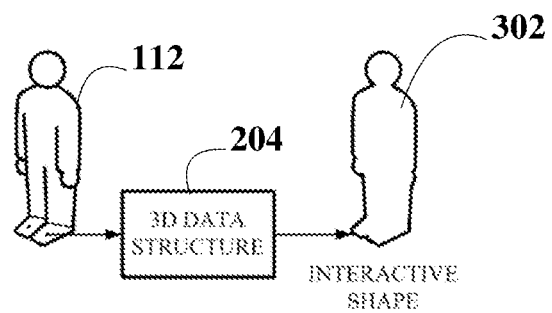

FIGS. 3A-B depict embodiments of a system 300 for generating a 3D interactive shape 302 from a 3D data structure 204. Some elements of FIG. 3A-B may be similar to elements of FIGS. 1-2D, and thus similar or identical reference numerals may be used to identify those elements.

FIG. 3A shows an example of a 3D interactive shape 302 of a car dynamic object 112 which is generated from the 3D data structure 204 of the car. The 3D data structure 204 refers to a data organization and storage format of 3D objects that enables efficient access and modification, including, for example, octrees, quadtrees, BSP trees, sparse voxel octrees, 3D arrays, and k-d trees. The 3D data structure 204 may be stored in the server or in the chip attached to or embedded in the dynamic object 112 and connected to the server.

In some embodiments, the 3D data structure 204 may be input via modeling tools such as via readily-available CAD or CAE models of the objects. For example, a car owner may provide an administrator of the persistent virtual world system or may input by themselves the already-existing digital CAD or CAE models of their car. For example, for a car dynamic object 112, the shape data from may be extracted from the 3D data structure 204 by means of inputting car model details or diagram in the server or chip, which may include the dimensions and shape of the car along with other components of the same. In other embodiments, the modeling tools enable a car or drone-based image-scanning pipeline to be input through a variety of photo, video, depth simultaneous location and mapping (SLAM) scanning in order to model the virtual replicas. In other embodiments, radar-imaging, such as synthetic-aperture radars, real-aperture radars, Light Detection and Ranging (LIDAR), inverse aperture radars, monopulse radars, and other types of imaging techniques may be used to map and model dynamic objects before integrating them into the persistent virtual world system. Utilizing these more technical solutions may be performed especially in cases where the original models of the structures are not available, or in cases where there is missing information or there is a need to add additional information to the virtual world entities which is not provided by the CAD or CAE models.

FIG. 3B shows an example of a 3D interactive shape 302 of a human being dynamic object 112 which is generated from the 3D data structure 204 of the human being. The 3D data structure 204 of the human being may be input via suitable imaging techniques or by inputting the data in the memory of the server or chip. For example, the 3D data structure 204 of a human may be generated by providing and storing in the server or chip a plurality of images of the human being that would server to extract dimensional and shape data to generate the 3D data structure 204 required for creating the 3D interactive shape 302. In other embodiments, a pre-designed human avatar may also be available for selection by a user, which may enable changing features like dimensions and shape of the human avatar that would thereafter be available as a 3D interactive shape 302.

When the 3D data structure 204 directly generates the 3D interactive shape, the level of accuracy of the interactive shape with respect to the dynamic object may be higher than an approximation via extrapolation or interpolation, but may require more data as well as processing power to generate the 3D interactive shape.

Figure 4A:
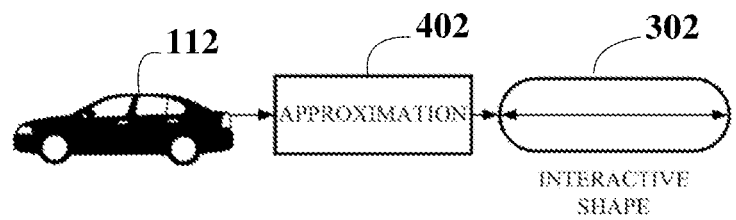
FIGS. 4A-4B depict an interactive volume generated from an approximation, as used in a system for virtually attaching digital reality applications to and/or enabling interactions with dynamic objects, according to an embodiment.
Figure 4B:
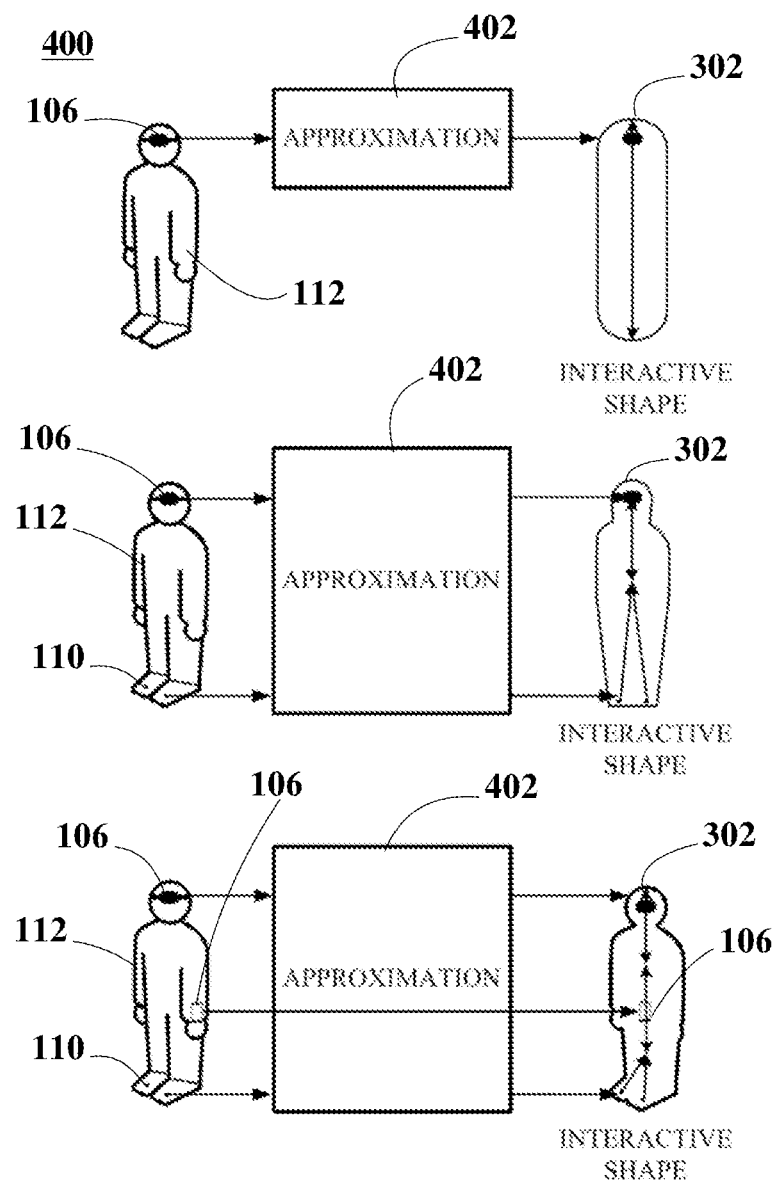

FIGS. 4A-B depict embodiments of a system 400 for generating a 3D interactive shape 302 from an approximation 402. Some elements of FIG. 4A-B may be similar to elements of FIGS. 1-3B, and thus similar or identical reference numerals may be used to identify those elements.

Making reference to FIG. 4A, approximation 402 of a car dynamic object 112 is performed to generate a 3D interactive shape 302 in the form of an oval. In the specific example of FIG. 4A, a car includes only one chip that stores the location of the car. Through interpolation or extrapolation techniques, the actual shape of the car may be approximated based on the chip location on the car. Other shapes suitable for interaction with a user that represent an approximation 402 of the original dynamic object shape may be employed, such as rectangles, squares, circles, or combinations of different shapes.

Making reference to FIG. 4B, approximation 402 of a human is performed to generate a 3D interactive shape 302 in different forms. The accuracy of the 3D interactive shape 302 is directly proportional to the number and location of devices on the human user, where each device provides a number of data points that can serve to approximate via extrapolation or interpolation and generate the 3D interactive shape 302. In FIG. 4B, three examples are shown of a human shape approximation 402.

In a first example on top of FIG. 4B, a human using a head-mounted display client device 106 that provides geo-location data points that can be used to approximate the 3D interactive shape 302. The generated 3D interactive shape 302 has an elongated oval shape that can be interacted with by other users when viewed in a digital reality.

In a second example in the middle section of FIG. 4B, a human using a head-mounted display client device 106 and one or more chips 110 generate further data points that can be used to approximate the 3D interactive shape, which is more accurate than the interactive shape generated in the first example of FIG. 4B.

In a third example in the bottom section of FIG. 4B, a human using a head-mounted display client device 106, a mobile phone client device 106, and one or more chips 110 generate further data points that can be used to approximate the 3D interactive shape, which is more accurate than the interactive shapes generated in the first and second examples of FIG. 4B.

Figure 5:
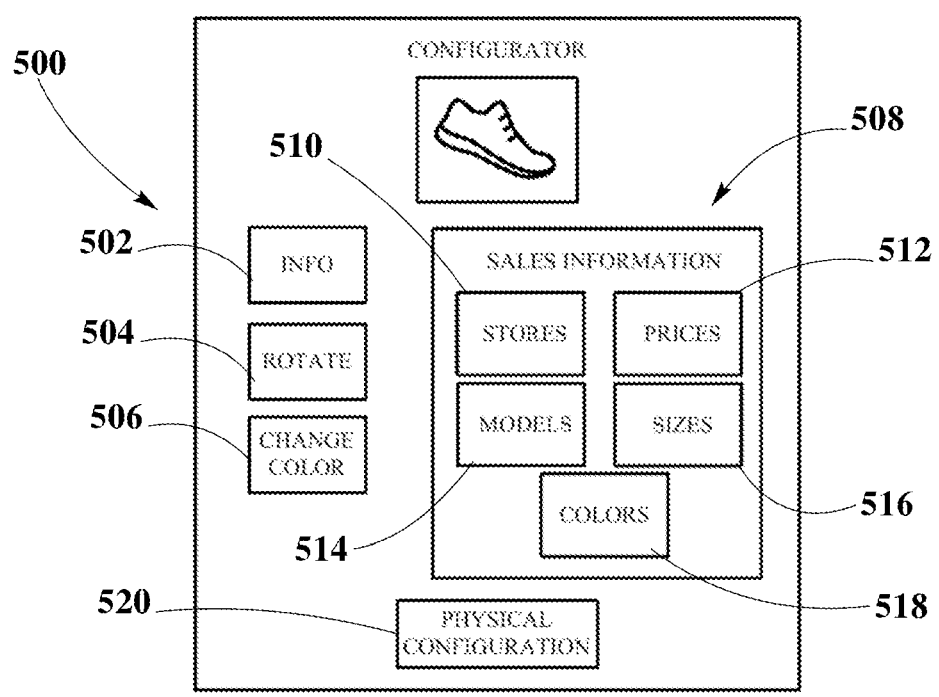
FIG. 5 depicts an example embodiment of a digital reality application virtually attached to a dynamic object.

FIG. 5 depicts an example embodiment of a digital reality application providing the functions of a configurator 500 attached to or embedded in a dynamic object such as a shoe.

The configurator 500 enables an end-user to virtually modify a host dynamic object but also to implement one or more physical changes on the host dynamic object. For example, the configurator 500 may enable a user to view a shoe worn by another user or located in a store, and may augment the shoe to view shoe info 502 such as the shoe model, size, color, and price. The user may have other augmentation options, such as rotating 504 the shoe and changing the color 506.

The configurator 500 may further connect through a network to store servers including sales information 508, which may include available stores 510, prices 512, models 514, sizes 516, and colors 518.

The configurator 500 may further enable adjustments in the physical configuration 520 of the shoe, such as changing the temperature of the shoe (e.g., cooling down, drying, or heating the shoe) subject to specific entitlements (e.g., enabling such features only to owners of the shoe). It may be understood by someone skilled in the art that in order for a physical change to be implemented in the shoe, corresponding operational mechanisms need to be connected to the chip attached to or embedded in the shoe, such as a power source, and I/O module, a network interface, and one or more heating or cooling elements.

Figure 6:
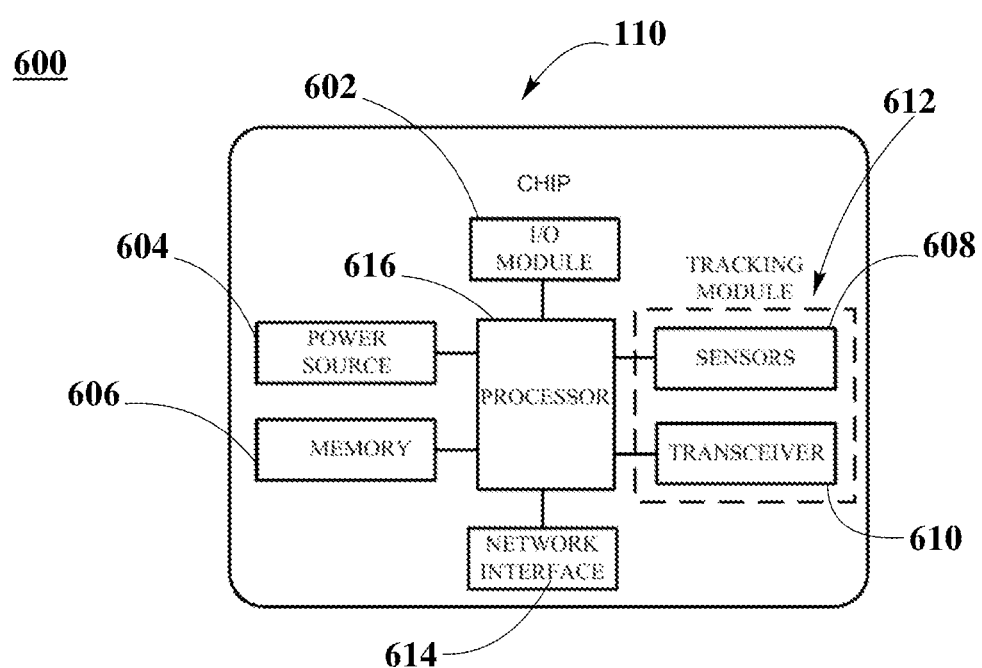
FIG. 6 depicts operational components of a chip used in a system for virtually attaching digital reality applications to and/or enabling interactions with dynamic objects, according to an embodiment.

FIG. 6 depicts operational components 600 of a chip 110 used in a system for virtually attaching digital reality applications to and/or enabling interactions with dynamic objects, according to an embodiment.

The chip 110 may comprise operational components such as an input/output (I/O) module 602; a power source 604; a memory 606; sensors 608 and transceivers 610 forming a tracking module 612; and a network interface 614, all operatively connected to a processor 616.

The I/O module 602 is implemented as computing hardware and software configured to interact with users and provide user input data to one or more other system components. For example, I/O module 602 may be configured to input data directly to the chip, generate user input data based on the interaction, and provide the user input data to the processor 616 before being transferred to other processing systems via a network, such as to a server or to a client device. In another example, I/O modules 602 is implemented as an external computing pointing device (e.g., a touch screen, mouse, 3D control, joystick, gamepad, and the like) and/or text entry device (e.g., a keyboard, dictation tool, and the like) configured to interact with client devices. In yet other embodiments, I/O module 602 may provide additional, fewer, or different functionality to that described above.

The power source 604 is implemented as computing hardware and software configured to provide power to the chip 110. In one embodiment, the power source 604 may be a battery. The power source 604 may be built into the devices or removable from the devices, and may be rechargeable or non-rechargeable. In one embodiment, the devices may be repowered by replacing one power source 604 with another power source 604. In another embodiment, the power source 604 may be recharged by a cable attached to a charging source, such as a universal serial bus ("USB") FireWire, Ethernet, Thunderbolt, or headphone cable, attached to a personal computer. In yet another embodiment, the power source 604 may be recharged by inductive charging, wherein an electromagnetic field is used to transfer energy from an inductive charger to the power source 604 when the two are brought in close proximity, but need not be plugged into one another via a cable. In another embodiment, a docking station may be used to facilitate charging.

The memory 606 may be implemented as computing hardware and software adapted to store application program instructions. The memory 606 may be of any suitable type capable of storing information accessible by the processor 616, including a computer-readable medium, or other medium that stores data that may be read with the aid of an electronic device. The memory 606 may include temporary storage in addition to persistent storage.

The sensors 608 may be implemented as computing hardware and software adapted to obtain sensory data and determine/track the position and orientation of the chip 110 and send that information to the server or to the client device to determine the position and orientation of the host dynamic object. The sensors 608 may also include one or more Inertia Measuring Units (IMUs), accelerometers, and gyroscopes. The IMU is configured to measure and report the velocity, acceleration, angular momentum, speed of translation, speed of rotation, and other telemetry metadata of client devices 106 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 610 may be implemented as computing hardware and software configured to enable devices to receive wireless radio waves from antennas and to send the data back to the antennas. In some embodiments, mmW transceivers may be employed, which may be configured to receive mmW wave signals from antennas and to send the data back to antennas when interacting with media content. The transceiver 610 may be a two-way communication transceiver 610.

In an embodiment, the tracking module 612 may be implemented by combining the capabilities of the IMU, accelerometers, and gyroscopes with the positional tracking provided by the transceivers 610 and the accurate tracking, low-latency and high QOS functionalities provided by mmW-based antennas may enable sub-centimeter or sub-millimeter positional and orientational tracking, which may increase accuracy when tracking the real-time position and orientation of dynamic objects. In alternative embodiments, the sensing mechanisms and transceivers 610 may be coupled together in a single tracking module device.

The network interface 614 may be implemented as computing software and hardware to communicatively connect to a network, receive computer readable program instructions from the network sent by the server or by client devices, and forward the computer readable program instructions for storage in the memory 606 for execution by the processor 616.

The processor 616 may be implemented as computing hardware and software configured to receive and process data that may be trigger one or more changes on the host dynamic object or on the interactive shape representing the host dynamic object. For example, the processor 616 may be configured to provide server data requests, provide data to the server or to the client devices, receive and process position and orientation data from the sensors, and/or provide data to one or more other system components. For example, the processor 616 may receive user input data from I/O module 602 and may respectively implement application programs stored in the memory 606. In other examples, the processor 616 may receive sensory data from sensing mechanisms captured from the real world, or may receive an accurate position and orientation of the dynamic objects through the tracking module 612, and may prepare some of the data before sending the data to a server for further processing.

Figure 7:
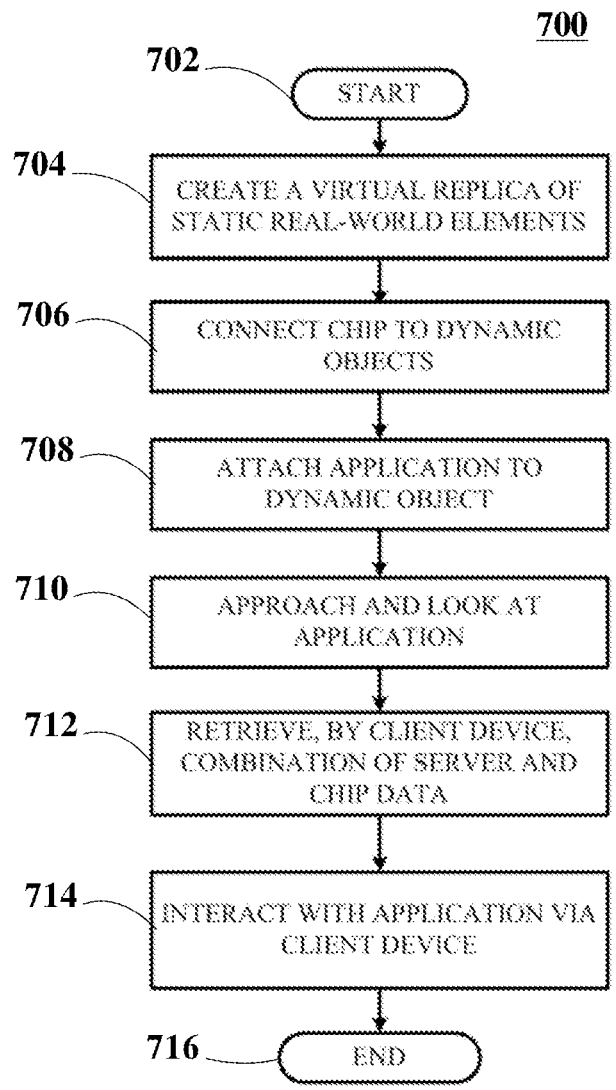
FIG. 7 depicts a method for virtually attaching digital reality applications to and/or enabling interactions to dynamic objects, according to an embodiment.

FIG. 7 depicts a method 700 for virtually attaching digital reality applications to and/or enabling interactions with dynamic objects, according to an embodiment. Method 700 may be implemented by a system, such as the systems described with reference to FIGS. 1-6.

According to an embodiment, method 700 starts in blocks 702 and 704 by creating, via a replica editor stored in the server, virtual replicas of static objects from the real world including at least location and space settings, physics settings, and 3D data structure. The method 700 continues in block 706 by connecting one or more chips to dynamic objects comprising a memory and processor, the memory including data and instructions that, when executed by the processor, trigger one or more actions by the host dynamic object, the data comprising at least geo-location data of the host dynamic objects.

In block 708, the method 700 continues by virtually attaching one or more applications to the dynamic objects, which can be done by linking the application data to the dynamic objects directly in the server or in the chip. The method 700 continues in block 710 by approaching and looking, by a user employing a client device, at one or more of the digital reality applications linked to the dynamic object, and then, in block 712, by retrieving, by a client device, a combination of server and chip data that outputs applications and interactions in a persistent virtual world system. Finally, the method 700 ends by a user interacting with digital reality application content via client devices while the dynamic object is tracked, as viewed in blocks 714 and 716.

According to an embodiment, the method 700 further comprises retrieving from the server by the chip, data of the dynamic objects comprising physics, 3D data structure, and applications; combining the data with the geo-location from the chip; streaming the data directly to the client devices; simultaneously receiving, by the client device, static objects data from the server; and merging, by the chip, chip data and server data into one persistent virtual world system.

In another embodiment, the method 700 further comprises retrieving, by the client device, data comprising 3D data structure, applications, and geo-location, from the chip; simultaneously receiving static object data from the server; and combining the data into a persistent virtual world system that is output by the client device.

In another embodiment, the method 700 further comprises storing in the server data comprising physics, 3D data structure, and applications virtually attached to the dynamic objects; retrieving, by the server, geo-location data from the chip; and merging the geo-location data from the chip and the server data into a persistent virtual world system, which are streamed to the client device.

In another embodiment, the method 700 further comprises storing in the chip data comprising physics, 3D data structure, applications, and geo-location; transferring the data to the server; and merging the chip data and the static objects data into a persistent virtual world system, which are streamed to the client device.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system comprising:
   one or more servers containing a persistent virtual world system comprising virtual replicas of static objects and host dynamic objects of the real world; and
   chips installed on host dynamic objects having variable positions and orientations in the real world, the chips comprising a memory and processor, the memory including dynamic object data and instructions that, when executed by the processor, trigger the processor to perform one or more actions on the respective host dynamic object, the dynamic object data comprising at least geo-location data of the host dynamic objects, wherein the persistent virtual world system includes a combination of data from the one or more servers and data from the chips, and wherein as a client device approaches a host dynamic object associated with a digital reality application, the digital reality application retrieves the physical position and orientation of the client device and triggers the client device to retrieve and output application data from the one or more servers.

2. The system of claim 1, wherein the dynamic object data includes a 3D data structure configured to generate a 3D interactive shape.

3. The system of claim 2, wherein the 3D interactive shape is generated by extrapolating or interpolating shape data from one or more of the chips, the client device, or a combination of shape data from the one or more chips and the client device.

4. The system of claim 1, wherein the chips are configured to retrieve additional data comprising one or more applications or application data from the one or more servers, wherein the chips are configured to combine the additional data with the geo-location data stored in the chips and stream the combined data to the client device.

5. The system of claim 1, wherein the dynamic object data comprises one or more applications or application data and the geo-location data and is configured to be retrieved by the client device directly from the chip and combined by the client device with static object data from the one or more servers into the persistent virtual world system.

6. The system of claim 1, wherein additional data comprising a 3D data structure or one or more applications virtually attached to the host dynamic objects are stored in the one or more servers, wherein the chip includes a reference to one or more locations of the additional data in the one or more servers, and wherein the one or more servers are configured to merge the geo-location data from the chip and the additional data into the persistent virtual world system.

7. The system of claim 1, wherein additional data comprising one or more applications or application data and geo-location data are stored in the chip and are transferred to the one or more servers, wherein the one or more servers are configured to merge the additional data and static object data into the persistent virtual world system.

8. A chip installed on a host dynamic object, the chip comprising:
a memory storing dynamic object data and instructions of a virtual replica of the host dynamic object in a persistent virtual world system, the host dynamic object having a variable position and orientation in the real world, the dynamic object data comprising at least geo-location data of the host dynamic object;
a processor configured to execute the instructions in the memory that, when executed, cause the host dynamic object to be virtually or physically manipulated; and
one or more sensors configured to provide at least the geo-location data of the host dynamic object,
wherein the dynamic object data and data stored in a server are combinable to generate content in the persistent virtual world system to be streamed to client devices interacting with applications.

9. The chip of claim 8, wherein the dynamic object data includes a 3D data structure configured to generate a 3D interactive shape.

10. The chip of claim 9, wherein the 3D interactive shape is generated by extrapolating or interpolating shape data from the chip, or one or more of the client devices, or a combination of shape data from the chip and the one or more client devices.

11. The chip of claim 8, wherein the chip is configured to retrieve additional data comprising one or more applications or application data from the server, to combine the additional data with the geo-location data stored in the chip, and to stream the combined data to the client devices.

12. The chip of claim 8, wherein the chip is configured to directly provide additional data comprising one or more applications or application data along with the geo-location data to the client devices.

13. The chip of claim 8, wherein additional data comprising one or more applications virtually attached to the host dynamic object are stored in the server, wherein the server is configured to merge the geo-location data from the chip and additional data into the persistent virtual world system.

14. The chip of claim 8, wherein additional data comprising one or more applications or application data are stored in the chip along with the geo-location data and are transferred to the server, wherein the server is configured to merge the additional data and static object data into the persistent virtual world system.

15. A method comprising:
creating, via a replica editor stored in a server, virtual replicas of static objects from the real world, the virtual replicas including at least location and space settings, physics settings that specify physical properties of the virtual replicas, and a 3D data structure;
connecting one or more chips to host dynamic objects having variable positions and orientations in the real world, the one or more chips comprising a memory and processor, the memory including dynamic object data and instructions that, when executed by the processor, trigger one or more actions by the respective host dynamic object, the dynamic object data comprising at least geo-location data of the host dynamic objects;
virtually attaching one or more applications to the host dynamic objects; and
generating a combination of data from the server and data from the chip in a persistent virtual world system.

16. The method of claim 15, wherein the dynamic object data further comprises a 3D data structure configured to generate a 3D interactive shape.

17. The method of claim 15, further comprising:
retrieving from the server by the one or more chips, additional dynamic object data comprising one or more applications or application data;
combining the additional dynamic object data with the geo-location data from the chip; and
streaming the combined data directly to one or more client devices.

18. The method of claim 15, further comprising retrieving, by the client device, data comprising a 3D data structure, application data, and the geo-location data from the chip;
receiving static object data from the server; and
combining the data retrieved from the chip and the received static object data into the persistent virtual world system.

19. The method of claim 15, further comprising storing in the server additional data comprising one or more applications virtually attached to the host dynamic objects;
retrieving, by the server, the geo-location data from the chip; and
merging the geo-location data from the chip and the additional data into the persistent virtual world system.

20. The method of claim 15, further comprising storing in the chip additional data comprising one or more applications or application data, along with the geo-location data;
- transferring the additional data and the geo-location data to the server; and
- merging the additional data and static object data into the persistent virtual world system.

* * * * *